United States Patent [19]
Perez C.

[11] Patent Number: 6,102,366
[45] Date of Patent: Aug. 15, 2000

[54] BALANCED VALVE OPERATED BY THE AXIAL DRIVING OF A STEM DISPLACING A SPECIAL ELASTOMERIC SEALING BODY

[76] Inventor: Sergio Perez C., Estado 235, of. 511, Santiago, Chile

[21] Appl. No.: 08/924,346

[22] Filed: Sep. 4, 1997

[51] Int. Cl.[7] ............................ F16K 25/02; F16K 39/02
[52] U.S. Cl. .......................... 251/175; 251/190; 251/282; 251/289
[58] Field of Search .................... 251/175, 190, 251/191, 282, 289

[56] References Cited

U.S. PATENT DOCUMENTS

| | | | |
|---|---|---|---|
| 998,695 | 7/1911 | Kieser | 251/324 X |
| 3,033,235 | 5/1962 | Thaning | 251/289 X |
| 3,265,353 | 8/1966 | Varga | 251/175 |
| 3,386,700 | 6/1968 | Greene et al. | 251/175 |
| 4,172,585 | 10/1979 | Rolfe | 251/175 X |
| 4,274,433 | 6/1981 | Schnall | 251/191 X |
| 4,280,680 | 7/1981 | Payne | 215/175 |
| 4,440,379 | 4/1984 | Behle et al. | 251/289 X |
| 4,834,133 | 5/1989 | LaCoste et al. | 137/315 |
| 5,149,055 | 9/1992 | Huber et al. | 251/324 |

*Primary Examiner*—John Rivell
*Attorney, Agent, or Firm*—Shlesinger, Arkwright & Garvey LLP

[57] ABSTRACT

A balanced valve for flows operated by the axial driving of a stem which commands a sealing body liable to axially slip between an opened position far from the valve seat and a closed seal in contact with the valve s eat. The valve basically consists in a valve body having an inlet opening for the flow with a valve seat at the bottom. The valve body also has an opening for the flow outlet oriented in a substantially cross-section way to the flow inlet. Between the inlet and outlet of flow there is a cylindrical cavity with a ring-shaped broadening in the zone communicating with the flow outlet above the valve seat. There is an elastomeric sealing body located inside the cylindrical cavity, which is mainly made up of a relatively solid sealing end, with a slightly greater height than the height of the ring-shaped broadening of the cylindrical activity. This sealing end is provided with one or more axial passes or holes, an d its also has a coaxial zone of radial seal located in the section of upper base of said sealing end, which consists of a circular groove in "V" section at the lower face of the sealing end near its periphery defining a perimetric lug. A variant of the valve considers a cylindrical elastomeric wall topping out the sealing end, which consists of an upper extension of the same sealing end, and topping in its other end in a radial edge withheld in the valve body. This elastomeric cylindrical wall may have one or more reinforcing rings conformed in its mantle and axially arranged.

17 Claims, 4 Drawing Sheets

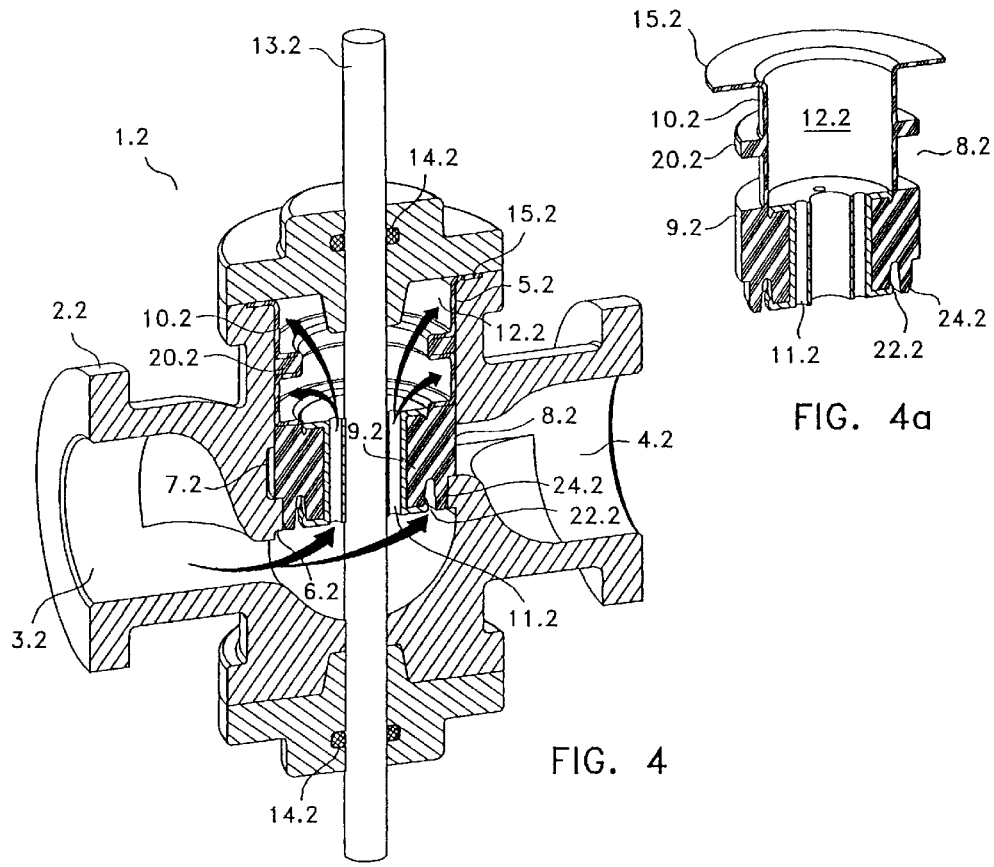
FIG. 4a
FIG. 4
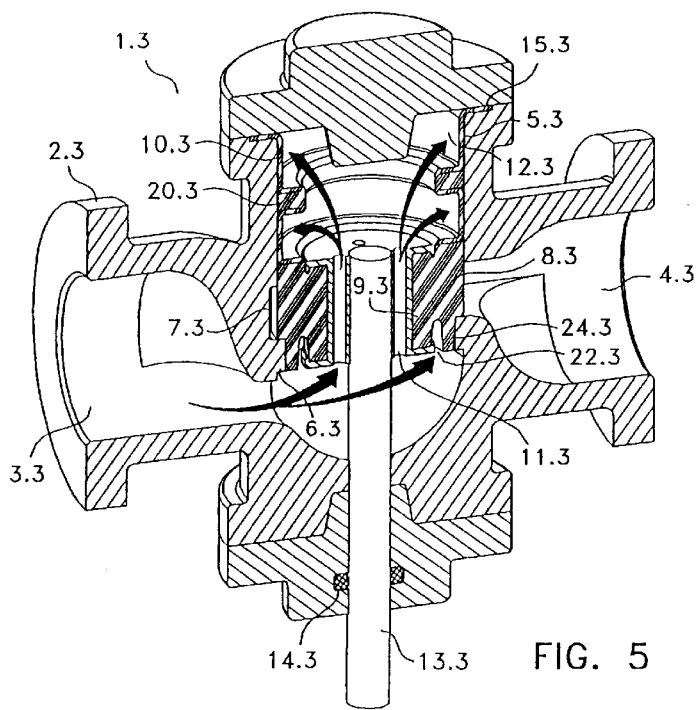
FIG. 5

BALANCED VALVE OPERATED BY THE AXIAL DRIVING OF A STEM DISPLACING A SPECIAL ELASTOMERIC SEALING BODY

BACKGROUND OF THE INVENTION

1. Field of the Invention

The present invention relates to a balanced valve operated by the axial driving of a stem displacing a special elastomeric sealing body, which allows the transfer of flow to a pressure compensating chamber.

2. Description of the Related Art

Most of the balanced valves of the state of the art allowing the passing of flow to a pressure compensating chamber, are of a complex structure, said valves offering a substantial rubbing between the sealing body and the walls of the valve along which this body slips. On the other hand, the sealing body of most of these valves requires the participation of additional sealing means to avoid flow leaks from the compensating chamber to the other parts of the valve. Additionally, the valves of the state of the art are complex and costly as regards the change of some components when damaged.

This invention, on the contrary, overcomes the disadvantages mentioned for the balanced valves of the prior art.

SUMMARY OF THE INVENTION

Basically, the valves of the invention have a valve body which is substantially similar to that of balanced valves of the state of the art, but, unlike the same, the sealing body consists in an elastomeric element made up of at least a sealing end associated with an axial driving stem. This sealing end is solid and is provided with axial passes allowing the passing of flow from the main feed line to a pressure compensating chamber of the valve body. The sealing body slips tightly through a cylindrical cavity of the valve body, this cavity being opened in one of its end where it communicates with the seating zone of the valve, its other end being closed, in which zone the pressure compensating chamber is defined.

The sealing body may in addition have an elastomeric cylindrical wall integrated in the sealing element in its opposing end to the sealing one, the end of this cylindrical wall being anchored in the closed end of the cylindrical cavity. In this case, the elastomeric cylindrical wall of the sealing body allows the isolation of the flow confined in the compensating chamber, so that the sealing end does not require a radial adjustment with the chamber walls, thus the rubbing of the system being reduced.

BRIEF DESCRIPTION OF DRAWINGS

For a better understanding of the invention, it shall be described with the help of the drawings, wherein:

FIG. 4 is a half-sectional, parallel perspective view, with the valve in closed position, corresponding to a version gathering three alternative embodiments which are not necessarily concurrent: a sealing body with reinforcing rings in its cylindrical elastomeric wall, a sealing end with a radial seal and a stem with dual access in its command.

FIG. 4a shows a half-sectional, perspective parallel view of the sealing body of the version of FIG. 4.

FIG. 5 shows a parallel perspective view similar to that of the valve of FIG. 4 with the valve in closed position, but offering a stem with lower access.

DETAILED DESCRIPTION OF INVENTION

Figure 1:
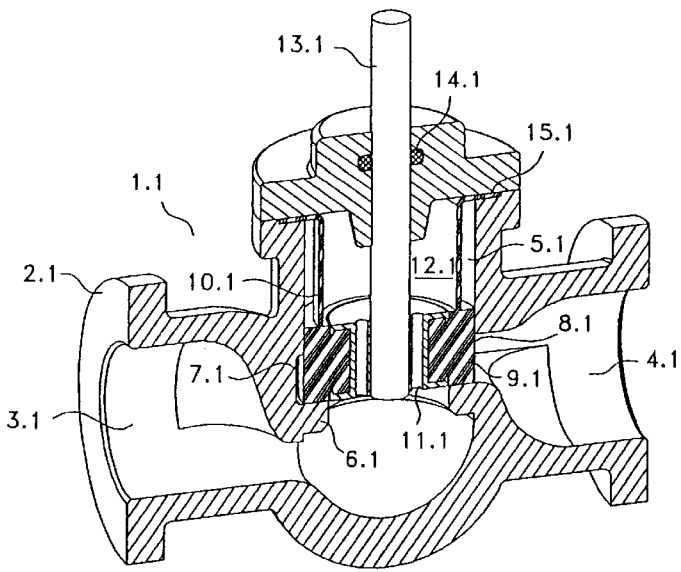
FIG. 1 shows a half-sectional, parallel perspective view of a first embodiment of the valve in accordance with the invention showing the sealing body without pressure load, that is, when the valve is still without flow with said sealing body in the closed valve position.
Figure 2:
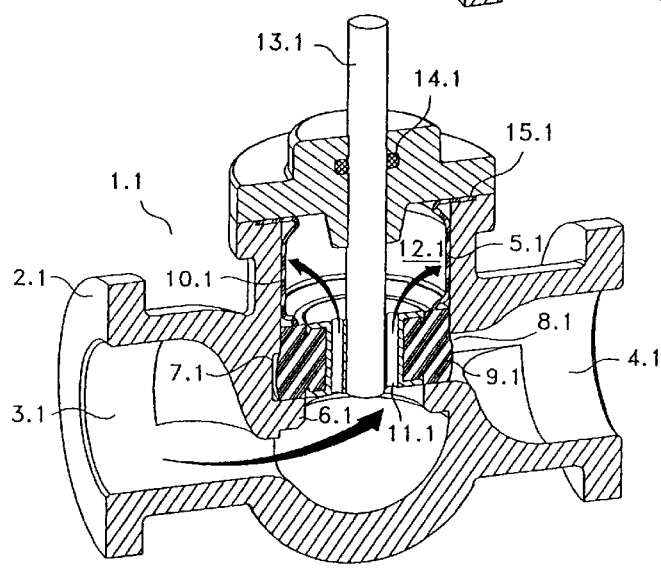
FIG. 2 is a similar view to that of FIG. 1 with the valve in closed position, but with the valve subject to the pressures of the flow network.
Figure 3:
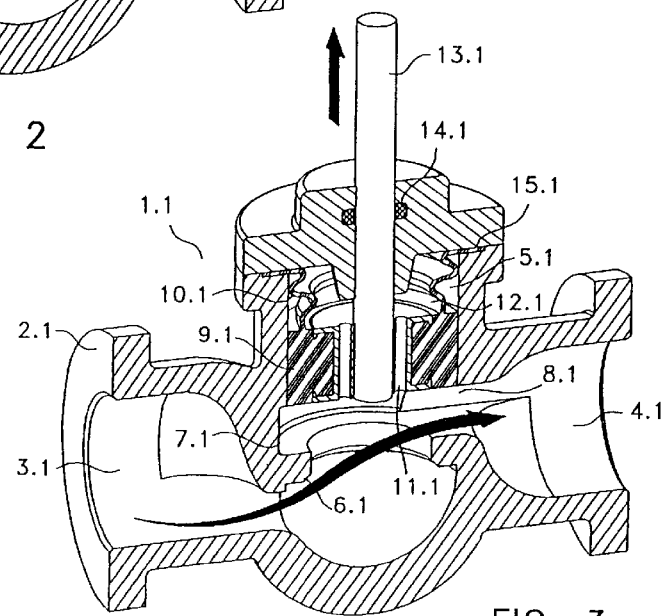
FIG. 3 shows a view which is equivalent to that of FIG. 2 with the valve in opened position.

FIGS. 1 through 3 show a first embodiment of the valve of the invention. The valve 1.1 is made up of a valve body 2.1 with an opening for the inlet of flow 3.1 and an opening for the outlet of flow 4.1, which are substantially collineate each other, although they can be angular to each other.

The valve body 2.1 has a cylindrical cavity 5.1 located between the inlet of flow 3.1 and the outlet of flow 4.1, communicating in its opened base with said flow inlet 3.1, and radially communicating with said flow outlet 4.1. The opposing end of the cylindrical cavity 5.1 is substantially closed and, in its opened base, a valve seat 6.1 is defined. The bottom part of the cylindrical cavity 5.1 has a ring-shaped broadening 7.1 acting as port and communicating with the flow outlet 4.1.

In the cylindrical cavity 5.1 an elastomeric sealing body 8.1 is accommodated, which, in this version, is made up of a sealing end 9.1, an axial sealing end in this case, topped out by a cylindrical wall 10.1 with a smaller diameter than the sealing end 9.1. The sealing end 9.1 is substantially solid with a slightly smaller diameter than the diameter of the cylindrical cavity 5.1 and with a height greater than the ring-shaped broadening height 7.1, and is provided with a plurality of substantially axial holes or passes 11.1. The upper edge of the cylindrical wall 10.1 of the elastomeric sealing body 8.1 tops in a radial edge 15.1 allowing to withhold or anchorage the sealing elastomeric body 8.1 in the valve body 2.1. The internal zone of the cylindrical wall 10.1 defines a pressure compensating chamber 12.1, which is communicated with the flow inlet 3.1 through axial holes or passes 11.1 of the sealing body 8.1.

The diameter of the cylindrical cavity 5.1 is greater than the diameter of the opening in the valve seat 6.1, so that when the pressures in the system are balanced, the axial force resulting in the sealing end 9.1 acts in the direction and sense to close the valve.

The elastomeric sealing body 8.1 is axially interlocked with a driving stem 13.1 which, in this case, comes out from the upper part of the valve 1.1 and is associated with conventional sealing means, such as sealing rings 14.1.

In FIG. 1 the valve assembly 1.1 is shown empty, that is, without flow in its components, in order to see the geometry and location of the elastomeric sealing body 8.1 without strains.

FIG. 2 shows the valve 1.1 closed with the inlet flow flooding and exerting pressure on the pressure compensating chamber 12.1. The flow confined in this compensating chamber cannot be filtered to other parts of the valve, since it is restricted by the cylindrical wall of elastomeric nature. Due to this feature, the function of the sealing end 9.1 reduces only to producing the sealing in the valve seat 6.1, thus preventing the flow to go from the flow inlet 3.1 to the ring-shaped broadening 7.1, and with this, preventing the flow passing to the flow outlet 4.1; therefore, it is not necessary that the diameter of this sealing end 9.1 is tight to the diameter of the cylindrical cavity 5.1, thus the reduction of rubbing of the moving elements in the valve being minimized, the operation becoming smoother when the driving stem 13.1 is commanded.

FIG. 3 shows the valve 1.1 opened, as the result of axially displacing the driving stem 13.1 to move the sealing end 9.1 away from the valve seat 6.1 until totally or partially exposing the ring-shaped broadening 7.1 to the flow inlet, which is driven to the flow outlet 4.1. When the sealing end 9.1 is lifted, the cylindrical wall 10.1 collapses, the volume of the pressure compensating chamber 12.1 being reduced, from which a part of the excess flow is discharged to the ring-shaped broadening 7.1, a uniform pressure being kept in said compensating chamber 12.1, which is equal to the pressure in the face of the sealing end 9.1 facing the valve seat 6.1.

FIG. 4 shows a valve of the invention gathering three types of variants as regards a valve previously described and depicted in FIGS. 1 through 3. These three variants are independent each other. Two of these variants relate to the elastomeric sealing body 8.2 (shown isolated in FIG. 4a), which consist on the one hand of a plurality of reinforcing rings 20.2 integrated in the cylindrical elastomeric wall 10.2 and, on the other hand, of a sealing end 9.2 with radial seal. The third variant relates to the driving stem 13.2. The other components of the valve are substantially similar to those previously described, and their reference numbers keep the same numbering in the digits to the left of the point (.), only the right digit being replaced with that corresponding to the version (*.2).

The sealing elastomeric body 8.2 being accommodated in the cylindrical cavity 5.2 of the valve body 2.2 is made up of a sealing end 9.2 topped out by a cylindrical wall 10.2 with a diameter smaller than the sealing end 9.2. Like the embodiment depicted in FIGS. 1 through 3, the sealing end 9.2 is substantially solid with a diameter slightly smaller than the diameter of the cylindrical cavity 5.2 and with a height greater than the height of the ring-shaped broadening 7.2, being provided with a plurality of substantially axial holes or passes 11.2.

In this first variant of the sealing elastomeric body 8.2, the cylindrical wall 10.2 has at least one reinforcing wall 20.2 axially located and which allows to get a more uniform folding or collapse degree in the cylindrical wall 10.2 when the same is constructed with a greater height (e.g. to regulate volumes of flows or control greater outlet flows).

The purpose of a second variant of the elastomeric sealing body 8.2 and which is independent from the variant just described, is to get both an axial and radial adjustment in the valve seat 6.2, to which effect the sealing end 9.2 has a diameter reduction in its bottom end, which adjusts to the opening of the valve seat and has a circular groove 22.2 of "V" section in its bottom face near the periphery, thus a perimetric lug 24.2 being defined. When the sealing end 9.2 is in contact with the valve seat 6.2, the bottom face corresponding to the portion of greater diameter is axially seated in said valve seat 6.2, the end with the smaller diameter going through its opening, so that the pressure of the inlet flow also acts in the circular groove 22.2 expanding the lug 24.2, a radial seal being produced in the opening of the valve seat 6.2.

A third variant of the valve and which is shown in FIG. 4, is to associate the sealing body 8.2 with an axial driving stem 13.2 projecting in both sides to the outside of the valve body in order to provide the valve command with a greater flexibility, according to the specific application.

In FIG. 5 another variant of the valve of the invention has been depicted, as regards the location and direction of operation of the axial driving stem 13.3, which is associated with the sealing body 8.3, the former projecting in the sealing direction beyond the valve body 2.3. Although in FIG. 5 a special sealing body 8.3 has been depicted, it is evident that they may operate any of the variants of the sealing bodies described in this document.

Figure 6:
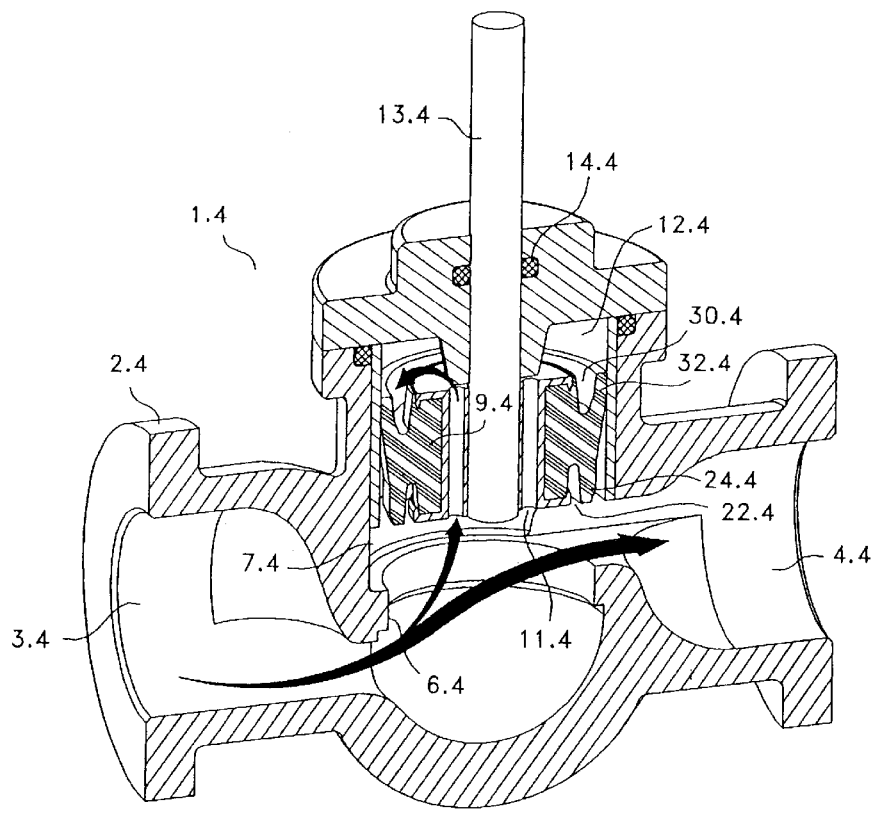
FIG. 6 is a half-sectional, parallel perspective view with the valve i n opened position, corresponding to another version of the invention in which it has a sealing body without elastomeric cylindrical wall.
Figure 7:
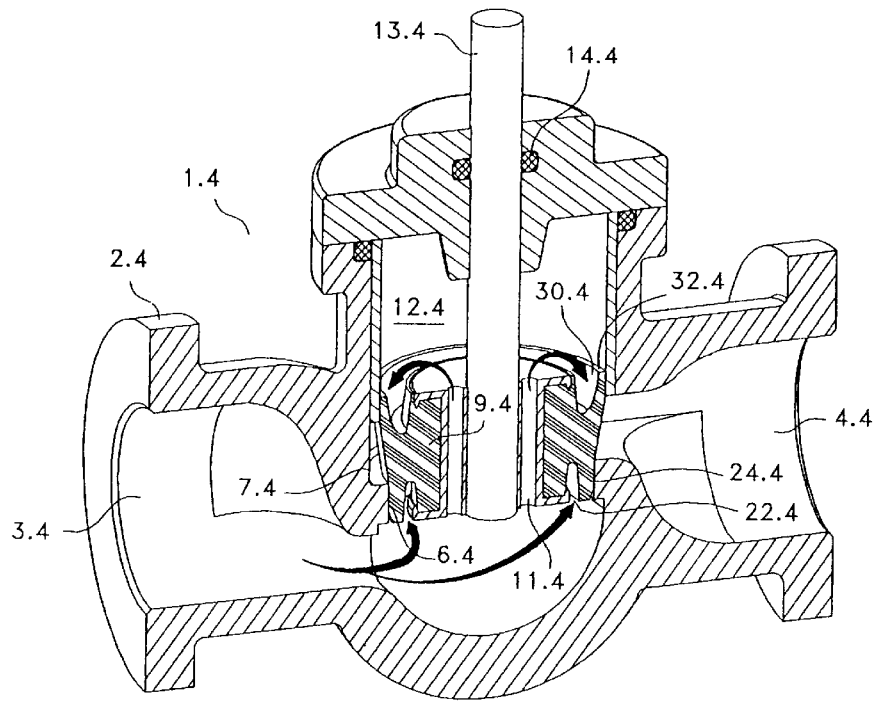
FIG. 7 shows a view which is equivalent to that of FIG. 6 with the valve in closed position.

Another variant of the sealing body 8.4 and which is shown in FIG. 6 (opened valve) and in FIG. 7 (closed valve) only consists in a sealing end 9.4 which adjustment to the valve seat 6.4 is of the radial type, to which effect this sealing end 9.4 has a circular groove 22.4 of "V" section in its bottom face near its periphery, thus a perimetric lug 24.4 being defined. When the sealing end 9.4 has gone through the opening of the valve seat 6.4, the pressure of the inlet flow also acts in the circular groove 22.4 expanding the lug 24.4, thus a radial seal being produced in the opening of the valve seat 6.4.

On the other hand and in order to ensure a suitable seal between the sealing body 8.4 and the cylindrical cavity 5.4 of the valve body 2.4 (which, in this version, agrees with the pressure compensating chamber 12.4, since there is not an elastomeric cylindrical wall in the sealing body 8.4), near the periphery of the upper face of the sealing end 9.4 a circular groove 30.4 of "V" section is located, thus a perimetric lug 32.4 being defined. The seal is produced, provided that there is pressure in the compensating chamber 12.4, since the flow expands the circular groove 30.4, thus compressing the lug 32.4 against the wall of the cylindrical cavity 5.4.

In order to keep a resulting axial force in the sealing end 9.4 which is positive in the sealing sense, the diameter of the opening of the valve seat 6.4 is lower than the diameter of the cylindrical cavity 5.4, and, consequently, the bottom diameter of the sealing end 9.4 is smaller than the upper diameter, which are relatively tight to the components with which they interact (opening of the valve seat 6.4 and cylindrical cavity 5.4).

Certain variations of the invention shall be considered obvious and, therefore, included in this protection.

A group of obvious variations may consist in the type of contact between the sealing end of the sealing body and the valve seat. Some of these variations are depicted in FIGS. 8 through 10.

Figure 8:
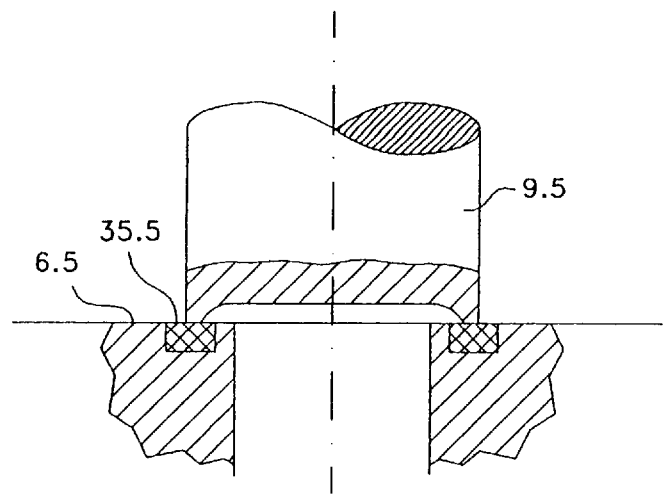
FIG. 8 is an elevational diagram with partial cuts of an embodiment with axial sealing and seat.

In FIG. 8, an axial-type contact seat is shown, where the valve seat 6.5 can have a circular reinforcement 35.5 of a suitable material to improve the contact with the sealing end 9.5, such as teflon, elastomers or similar.

Figure 9:
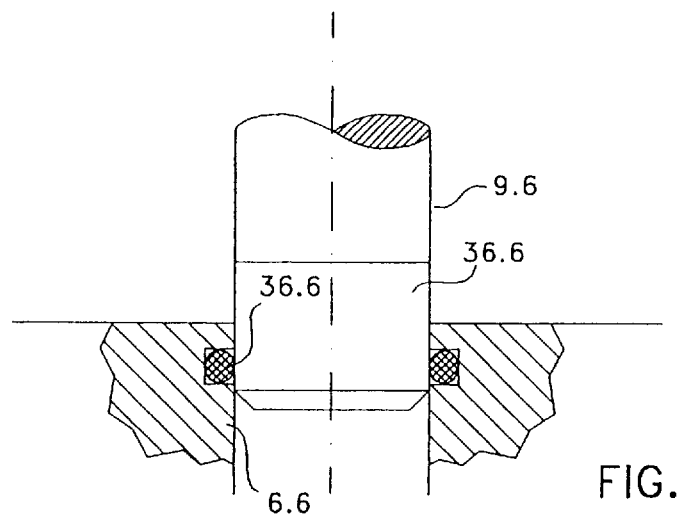
FIG. 9 is an elevational diagram with partial cuts of an embodiment with radial sealing and seat.

In FIG. 9, a radial-type seat contact is shown, where the opening of the valve seat 6.6 may accommodate a sealing ring 36.6 and the sealing end 9.6 has a bottom rigid end 38.6, such a metallic, plastic, rigid or similar. This bottom rigid end 38.6 can be solid or it can be a perimetric sheath.

Figure 10:
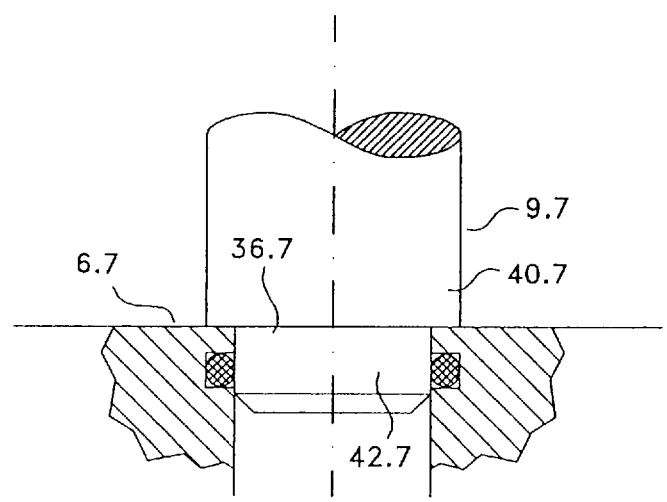
FIG. 10 is an elevational diagram with partial cuts of an embodiment of both radial and axial sealing and seat.

In FIG. 10, a mixed-type, that is axial and radial, seat contact is shown where the sealing end 9.7 has a bottom narrowing in its diameter, so that it shows a portion of axial seat 40.7 in its greater diameter zone, and a portion of radial seat 42.7 in its lower diameter zone. The portion of axial seat can be of the type already described in relation to FIG. 8, and the portion of radial seat can be of the type already described in relation to FIG. 9.

What is claimed is:

1. A balanced valve operated by the axial driving of a stem which commands a sealing body liable to axially slip between an opened position away from a valve seat and a closed seal in contact with the valve seat, comprising:
   a) a valve body having an inlet;
   b) a valve seat at a bottom of said inlet;
   c) an outlet communicating with said inlet;
   d) a cylindrical cavity provided between said inlet and outlet coaxially oriented to the bottom of said inlet;
   e) a ring-shaped broadening in said cylindrical cavity in a zone communicating with said outlet above said valve seat;
   f) an elastomeric sealing body located inside said cylindrical cavity, said sealing body including a sealing end and a cylindrical elastomeric wall extending upwardly from said sealing end;
   g) said sealing end being relatively solid with slightly greater height than the height of said ring-shaped broadening;
   h) said sealing end including at least one passageway;
   i) said sealing end including at least one coaxial sealing zone located at its bottom base;
   j) said cylindrical elastomeric wall has a diameter smaller than the diameter of said sealing end; and
   k) said cylindrical elastomeric wall including a radial edge portion secured to said valve body.

2. A balanced valve as in claim 1, wherein:
   a) said stem is rigidly associated with said sealing body; and
   b) said stem driving end axially projects outside said valve body and movable relative to said valve body such that movement away from said valve body corresponds to movement of said sealing body away from said valve seat.

3. A balanced valve as in claim 1, wherein:
   a) a lower end of said sealing end includes a cylindrical axial extension tightly fitting in the opening of said valve seat; and
   b) said valve seat includes a sealing ring engaging said cylindrical axial extension.

4. A balanced valve as in claim 1, wherein:
   a) a lower end of said sealing end has a cylindrical extension tightly fitting in the opening of said valve seat; and
   b) a bottom surface of said lower end includes a "V"-section circular groove near its periphery, thereby defining a perimetric lug.

5. A balanced valve as in claim 1, wherein:
   a) said sealing body includes a sealing zone located at a bottom base of said sealing end;
   b) a bottom surface of said sealing zone includes a slightly greater section than the opening of said valve seat; and
   c) an upper surface of said sealing zone includes a section equal to said bottom surface section.

6. A balanced valve as in claim 1, wherein:
   a) said sealing body includes a sealing zone located at a bottom base of said sealing end;
   b) a bottom surface of said sealing zone includes a slightly greater section than the opening of said valve seat; and
   c) an upper surface of said sealing zone includes a section greater than said bottom surface section.

7. A balanced valve as in claim 1, wherein:
   a) said stem is rigidly associated with said sealing body; and
   b) said stem driving end axially projects outside said valve body and movable relative to said valve body such that movement away from said valve body corresponds to movement of said sealing body toward said valve seat.

8. A balanced valve as in claim 1, wherein:
   a) a lower end of said sealing end includes a cylindrical axial extension tightly fitting in the opening of said valve seat; and
   b) said valve seat includes a sealing ring engaging said cylindrical axial extension.

9. A balanced valve as in claim 1, wherein:
   a) a lower end of said sealing end has a cylindrical extension tightly fitting in the opening of said valve seat; and
   b) a bottom surface of said lower end includes a "V"-section circular groove near its periphery, thereby defining a perimetric lug.

10. A balanced valve as in claim 1, wherein:
    a) said sealing body includes a sealing zone located at a bottom base of said sealing end;
    b) a bottom surface of said sealing zone includes a slightly greater section than the opening of said valve seat; and
    c) an upper surface of said sealing zone includes a section equal to said bottom surface section.

11. A balanced valve as in claim 1, wherein:
    a) said sealing body includes a sealing zone located at a bottom base of said sealing end;
    b) a bottom surface of said sealing zone includes a slightly greater section than the opening of said valve seat; and
    c) an upper surface of said sealing zone includes a section greater than said bottom surface section.

12. A balanced valve as in claim 1, wherein:
    a) said stem includes first and second end portions extending outside said valve body.

13. A balance valve as in claim 12, wherein:
    a) a lower end of said sealing end includes a cylindrical axial extension tightly fitting in the opening of said valve seat; and
    b) said valve seat includes a sealing ring engaging said cylindrical axial extension.

14. A balanced valve as in claim 12, wherein:
    a) a lower end of said sealing end has a cylindrical extension tightly fitting in the opening of said valve seat; and
    b) a bottom surface of said lower end includes a "V"-section circular groove near its periphery, thereby defining a perimetric lug.

15. A balanced valve as in claim 12, wherein:
    a) said sealing body includes a sealing zone located at a bottom base of said sealing end;

b) a bottom surface of said sealing zone includes a slightly greater section than the opening of said valve seat; and c) an upper surface of said sealing zone includes a section equal to said bottom surface section.

16. A balanced valve as in claim 12, wherein:

a) said sealing body includes a sealing zone located at a bottom base of said sealing end;

b) a bottom surface of said sealing zone includes a slightly greater section than the opening of said valve seat; and c) an upper surface of said sealing zone includes a section greater than said bottom surface section.

17. A balanced valve as in claim 1, wherein:

a) said elastomeric cylindrical wall includes a reinforcing ring disposed therewithin and spaced axially from said sealing end.

* * * * *